(12) United States Patent
Kobayashi et al.

(10) Patent No.: US 11,848,160 B2
(45) Date of Patent: Dec. 19, 2023

(54) MULTILAYER CERAMIC CAPACITOR

(71) Applicant: Murata Manufacturing Co., Ltd., Nagaokakyo (JP)

(72) Inventors: Yuji Kobayashi, Nagaokakyo (JP); Toshiyuki Horitani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 114 days.

(21) Appl. No.: 17/512,763

(22) Filed: Oct. 28, 2021

(65) Prior Publication Data
US 2022/0172897 A1 Jun. 2, 2022

(30) Foreign Application Priority Data

Nov. 27, 2020 (JP) .................................. 2020-197222

(51) Int. Cl.
*H01G 4/232* (2006.01)
*H01G 4/012* (2006.01)
*H01G 4/30* (2006.01)

(52) U.S. Cl.
CPC ........... *H01G 4/2325* (2013.01); *H01G 4/012* (2013.01); *H01G 4/30* (2013.01)

(58) Field of Classification Search
CPC ........... H01G 4/12; H01G 2/065; H01G 2/24; H01G 4/0085; H01G 4/012; H01G 4/20; H01G 4/2325; H01G 4/30; H01G 4/306; H01G 4/33; H01G 4/1227; H01G 4/248
See application file for complete search history.

(56) References Cited

U.S. PATENT DOCUMENTS

| | | | | |
|---|---|---|---|---|
| 2008/0210564 | A1* | 9/2008 | Motoki ................. | H10N 30/50 |
| | | | | 205/122 |
| 2017/0098506 | A1* | 4/2017 | Ando ..................... | H01G 4/228 |
| 2017/0208691 | A1 | 7/2017 | Masunari et al. | |
| 2017/0271083 | A1 | 9/2017 | Makino et al. | |
| 2017/0278633 | A1* | 9/2017 | Kato ..................... | H01G 4/2325 |
| 2017/0330689 | A1* | 11/2017 | Hatanaka ............... | H01G 2/065 |
| 2017/0345571 | A1* | 11/2017 | Imaeda .................. | H01G 4/248 |
| 2018/0012706 | A1* | 1/2018 | Bultitude ................ | H01G 4/33 |

(Continued)

FOREIGN PATENT DOCUMENTS

| | | |
|---|---|---|
| GB | 2 400 493 A | 10/2004 |
| JP | 05-004451 U | 1/1993 |

(Continued)

*Primary Examiner* — Michael P McFadden
(74) *Attorney, Agent, or Firm* — Keating & Bennett, LLP

(57) ABSTRACT

A multilayer ceramic capacitor includes a multilayer body including dielectric layers and internal electrode layers, and external electrodes electrically connected to the internal electrode layers. A difference of about 3 μm or less exists between a maximum thickness of a center portion of the external electrode and a thickness of a peripheral portion of the external electrode, and in a range of a field of view of about 50 μm square centered at a point located farther inward by about 15% than a peripheral end portion of the external electrode, an angle θ of about 4 degrees or less is defined by a straight line connecting two points of intersection of a surface of the external electrode and a sectional line defining the range of the field of view of about 50 μm square and a perpendicular line to a vertical line passing through one of the two points of intersection.

13 Claims, 5 Drawing Sheets

(56) References Cited

U.S. PATENT DOCUMENTS

2018/0082787 A1* 3/2018 Hamamori ............ H01G 4/2325
2018/0301281 A1* 10/2018 Park ....................... H01G 4/012
2019/0180938 A1 6/2019 Tahara et al.

FOREIGN PATENT DOCUMENTS

| JP | 2004-327983 A | 11/2004 |
| JP | 2017-126715 A | 7/2017 |
| JP | 2017-168746 A | 9/2017 |
| JP | 2019-102766 A | 6/2019 |

* cited by examiner

MULTILAYER CERAMIC CAPACITOR

CROSS REFERENCE TO RELATED APPLICATIONS

This application claims the benefit of priority to Japanese Patent Application No. 2020-197222 filed on Nov. 27, 2020. The entire contents of this application are hereby incorporated herein by reference.

BACKGROUND OF THE INVENTION

1. Field of the Invention

The present invention relates to a multilayer ceramic capacitor, and more specifically, to a multilayer ceramic capacitor connecting at least one of electrodes to an electrode on a mounting substrate by wire bonding.

2. Description of the Related Art

Conventionally, IC chips, ceramic electronic components, and the like may be mounted on a substrate. The IC chip may be adversely affected by flux contained in solder. Accordingly, the IC chip and the ceramic electronic component may be electrically interconnected by wire bonding. For example, Japanese Utility Model Laid-Open No. 05-004451 discloses a multilayer capacitor electrically connected to an IC chip by wire bonding.

As disclosed in Japanese Utility Model Laid-Open No. 05-004451, a multilayer capacitor electrically connected to an IC chip by wire bonding has a longer loop distance from the IC chip to the multilayer capacitor than mounting via solder and also provides a reduced cross-sectional area for a path for an electrical signal, and accordingly, high-frequency impedance tends to be high. When high-frequency impedance is high, high-frequency noise cannot be removed, which leads to defective operation of a ceramic electronic device. Generally, high-frequency impedance is reduced by providing a plurality of wires on a surface of an external electrode of a multilayer capacitor. In doing so, for example, the external electrode has the surface wire-bonded at a center and four corners.

In addition, the IC chip and the external electrode of the multilayer capacitor are interconnected specifically by methods, as follows. For example, in one method, the IC chip is initially wire-bonded and the multilayer capacitor is subsequently wire-bonded (i.e., 2nd bonding), and in another method, the multilayer capacitor is initially wire-bonded (i.e., 1st bonding) and the IC chip is subsequently wire-bonded. In the IC industry, typically, the IC chip is initially wire-bonded and another component is subsequently wire-bonded.

In recent years, however, as ceramic electronic components are increasingly miniaturized, it is increasingly difficult to accurately form on a ceramic electronic component an external electrode for connection by wire bonding. If the external electrode of the ceramic electronic component cannot be formed with high accuracy, the external electrode may vary in thickness.

When the multilayer capacitor with an external electrode varied in thickness and thus failing to have a uniform thickness has a surface wire-bonded, a wire-bonding nozzle (or capillary) would interfere with the external electrode, and wire bonding may be unable to provide reliable connection between a wire and the external electrode.

As a method for forming an external electrode with high accuracy, for example, a method for forming an external electrode by direct plating as disclosed in Japanese Patent Laid-Open No. 2004-327983 may be considered.

However, when the external electrode is formed by direct plating, moisture tends to penetrate between the external electrode and a ceramic body (a multilayer body) or the like into a ceramic electronic component, and there is a problem in that the ceramic electronic component has reduced moisture resistance.

SUMMARY OF THE INVENTION

Preferred embodiments of the present invention provide multilayer ceramic capacitors each having excellent moisture resistance while ensuring connection between a wire and an external electrode by wire bonding.

According to a preferred embodiment of the present invention, a multilayer ceramic capacitor includes a multilayer body including a plurality of stacked dielectric layers, and including a first major surface and a second major surface opposite to each other in a height direction and facing a mounting surface, a first side surface and a second side surface opposite to each other in a width direction orthogonal or substantially orthogonal to the height direction, and a first end surface and a second end surface opposite to each other in a length direction orthogonal or substantially orthogonal to the height direction and the width direction, a first internal electrode on the plurality of dielectric layers, located inside the multilayer body and extending to the first major surface, a second internal electrode on the plurality of dielectric layers, located inside the multilayer body and extending to the second major surface, a first external electrode on the first major surface, and a second external electrode on the second major surface, the first and second external electrodes including an underlying electrode layer including a metallic component and a ceramic component, and a plating layer on the underlying electrode layer, there being a difference of about 3 μm or less between a maximum thickness of a center portion of the first and second external electrodes and a thickness of a peripheral portion of the first and second external electrodes at a portion located on the first or second major surface and located farther inward than a peripheral end portion of the first and second external electrodes by about 10% of a length of the first and second external electrodes that connects the first and second side surfaces or the first and second end surfaces, in a range of a field of view of about 50 μm square centered at a point located farther inward by about 15% than the peripheral end portion of the first or second external electrode, an angle θ of about 4 degrees or less being defined by a straight line connecting points $P_1$ and $P_2$ of an intersection of a surface of the first and second external electrodes and a sectional line defining the range of the field of view of about 50 μm square and a perpendicular or substantially perpendicular line to a vertical line passing through the point of intersection $P_1$ or $P_2$.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the accompanying drawings.

1. Multilayer Ceramic Capacitor

Figure 1:
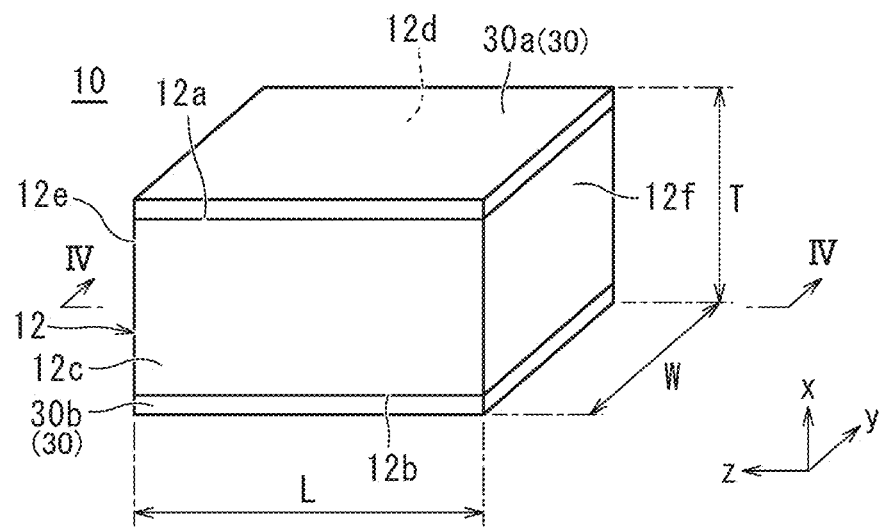
FIG. 1 is an external perspective view of an example of a multilayer ceramic capacitor according to a preferred embodiment of the present invention.
Figure 2:
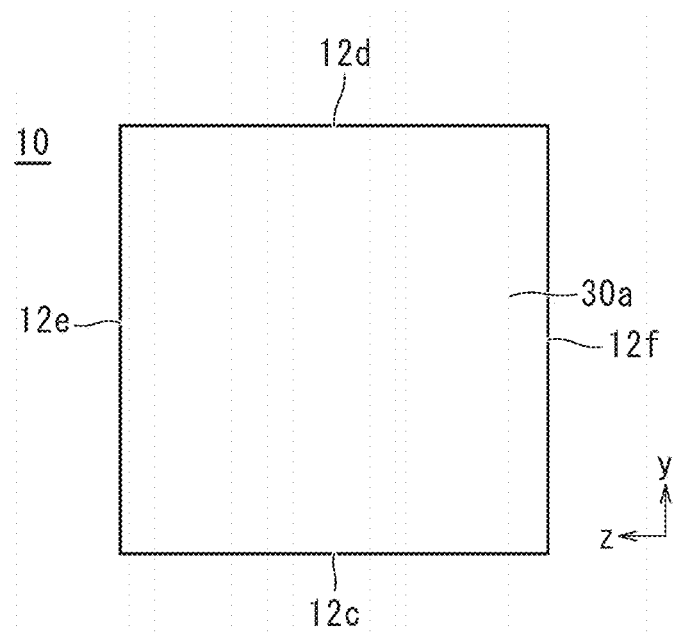
FIG. 2 is a top view of the multilayer ceramic capacitor shown in FIG. 1.
Figure 3:
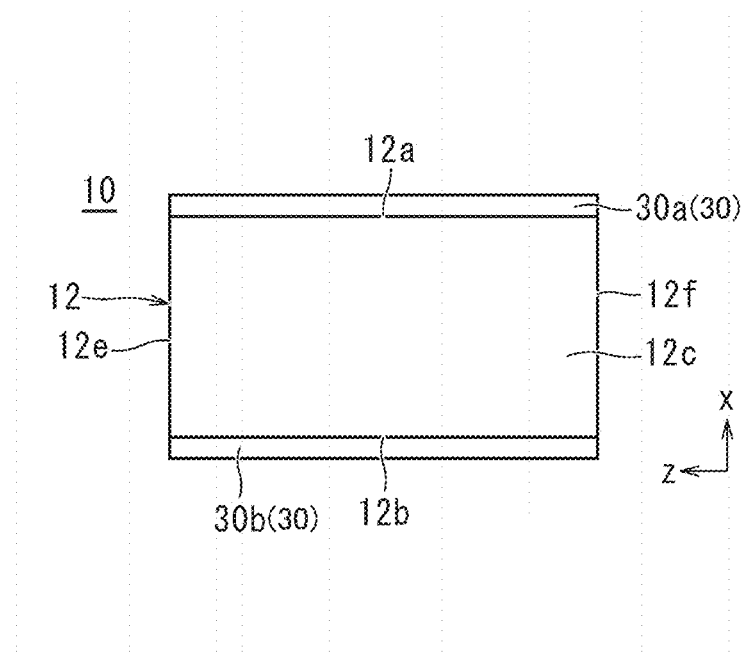
FIG. 3 is a front view of the multilayer ceramic capacitor shown in FIG. 1.
Figure 4:
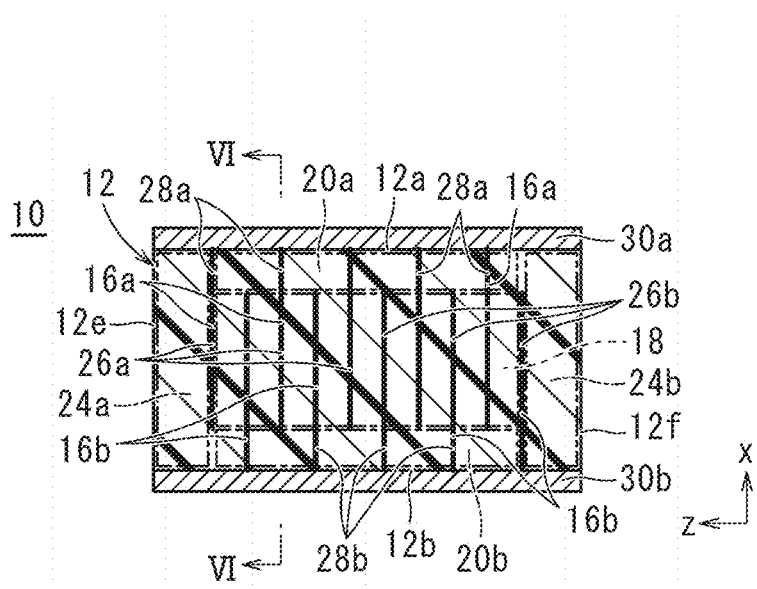
FIG. 4 is a cross section of the multilayer ceramic capacitor, taken along a line IV-IV indicated in FIG. 1.
Figure 5:
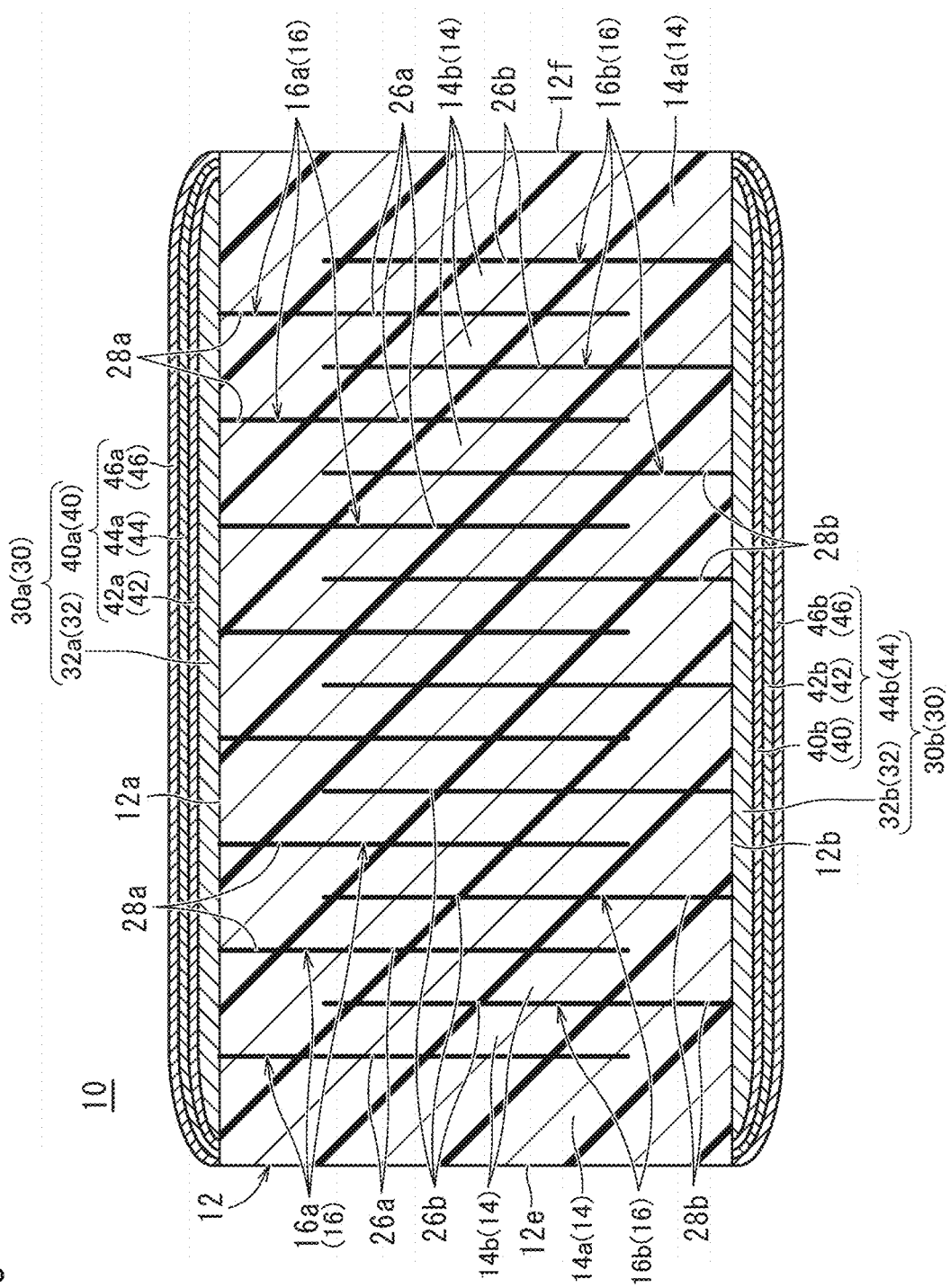
FIG. 5 is a cross section showing in detail a configuration of an external electrode in the cross section shown in FIG. 4.
Figure 6:
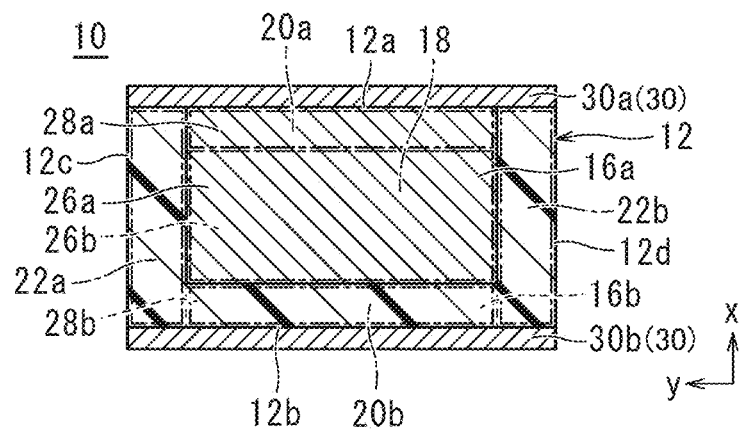
FIG. 6 is a cross section of the multilayer ceramic capacitor according to one of the preferred embodiments of the present invention, taken along a line VI-VI indicated in FIG. 4.

A multilayer ceramic capacitor according to a preferred embodiment of the present invention will be described below. FIG. 1 is an external perspective view of an example of the multilayer ceramic capacitor according to the present preferred embodiment of the present invention. FIG. 2 is a top view of the multilayer ceramic capacitor shown in FIG. 1. FIG. 3 is a front view of the multilayer ceramic capacitor shown in FIG. 1. FIG. 4 is a cross section of the multilayer ceramic capacitor according to the present preferred embodiment, taken along a line IV-IV indicated in FIG. 1. FIG. 5 is a cross section showing in detail a configuration of an external electrode in the cross section shown in FIG. 4. FIG. 6 is a cross section of the multilayer ceramic capacitor according to the present preferred embodiment, taken along a line VI-VI indicated in FIG. 4.

As shown in FIGS. 1 to 4, multilayer ceramic capacitor includes, for example, a rectangular or substantially rectangular parallelepiped multilayer body 12 and an external electrode 30.

Multilayer body 12 includes a plurality of dielectric layers 14 and a plurality of internal electrode layers 16 that are stacked in layers. Further, multilayer body 12 includes a first major surface 12a and a second major surface 12b opposite to each other in a height direction x, a first side surface 12c and a second side surface 12d opposite to each other in a width direction y orthogonal or substantially orthogonal to height direction x, and a first end surface 12e and a second end surface 12f opposite to each other in a length direction z orthogonal or substantially orthogonal to height direction x and width direction y. Multilayer body 12 preferably includes a corner and a ridge rounded. Note that a corner is a portion where three adjacent surfaces of the multilayer body meet one another, and a ridge is a portion where two adjacent surfaces of the multilayer body meet each other. Further, some or all of first and second major surfaces 12a and 12b, first and second side surfaces 12c and 12d, and first and second end surfaces 12e and 12f may have irregularities or the like.

Preferably, for example, 45 to 330 dielectric layers 14 are provided, including an outer layer.

Multilayer body 12 includes an inner layer portion 18 including one or more dielectric layers 14b and a plurality of internal electrode layers 16 disposed thereon. Inner layer portion 18 includes the plurality of internal electrode layers 16 opposite to one another.

Multilayer body 12 includes an outer layer portion 20a located on the side of first major surface 12a and including a plurality of dielectric layers 14a located between first major surface 12a and an outermost surface of inner layer portion 18 closer to first major surface 12a.

Similarly, multilayer body 12 includes an outer layer portion 20b located on the side of second major surface 12b and including a plurality of dielectric layers 14a located between second major surface 12b and an outermost surface of inner layer portion 18 closer to second major surface 12b.

Multilayer body 12 includes an outer layer portion 22a located on the side of first side surface 12c and including a plurality of dielectric layers 14b located between first side surface 12c, an outermost surface of inner layer portion 18 closer to first side surface 12c, and an extension line of that outermost surface.

Similarly, multilayer body 12 includes an outer layer portion 22b located on the side of second side surface 12d and including a plurality of dielectric layers 14b located between second side surface 12d, an outermost surface of inner layer portion 18 closer to second side surface 12d and an extension line of that outermost surface.

Multilayer body 12 includes an outer layer portion 24a located on the side of first end surface 12e and including a plurality of dielectric layers 14b located between first end surface 12e, an outermost surface of inner layer portion 18 closer to first end surface 12e, and an extension line of that outermost surface.

Similarly, multilayer body 12 includes an outer layer portion 24b located on the side of second end surface 12f and including a plurality of dielectric layers 14b located between second end surface 12f, an outermost surface of inner layer portion 18 closer to second end surface 12f, and an extension line of that outermost surface.

Outer layer portion 20a on the side of the first major surface and outer layer portion 20b on the side of the second major surface are portions where internal electrode layer 16 includes a lead electrode portion extending outward.

Outer layer portion 22a on the side of the first side surface and outer layer portion 22b on the side of the second side surface are each disposed on a side perpendicular or substantially perpendicular to internal electrode layer 16.

Outer layer portion 24a on the side of the first end surface and outer layer portion 24b on the side of the second end surface are disposed substantially parallel to internal electrode layer 16.

Dielectric layer 14 may be made, for example, of a dielectric material as a ceramic material. Such a dielectric material can be, for example, a dielectric ceramic material including a component such as $BaTiO_3$, $CaTiO_3$, $SrTiO_3$, or $CaZrO_3$. When the above dielectric material is included as a major component, a subcomponent, such as, for example, a Mn compound, an Fe compound, a Cr compound, a Co compound, or a Ni compound, having a content smaller than that of the major component may be added depending on desired characteristics of multilayer body 12.

Dielectric layer 14 preferably has, for example, a thickness of about 0.5 μm or more and about 42 μm or less after it is fired.

Multilayer body 12 includes a plurality of first internal electrode layers 16a and a plurality of second internal electrode layers 16b as the plurality of internal electrode layers 16. The plurality of first internal electrode layers 16a and the plurality of second internal electrode layers 16b are embedded so as to be alternately disposed at equal or substantially equal intervals in length direction z of multilayer body 12 with dielectric layer 14 interposed therebetween.

First internal electrode layer 16a includes a first opposite electrode portion 26a opposite to second internal electrode layer 16b, and a first lead electrode portion 28a located on the side of one end of first internal electrode layer 16a and extending from first opposite electrode portion 26a to first major surface 12a of multilayer body 12. First lead electrode portion 28a includes an end thereof extending to first major surface 12a and thus exposed.

While first opposite electrode portion 26a of first internal electrode layer 16a is not particularly limited in shape, it is preferably rectangular or substantially rectangular in plan view. However, it may have a rounded corner, a corner extending obliquely in plan view (or tapered), or the like. Alternatively, it may be tapered in plan view such that it is inclined toward either side.

While first lead electrode portion 28a of first internal electrode layer 16a is not particularly limited in shape, it is preferably rectangular or substantially rectangular in plan view. However, it may have a rounded corner, a corner extending obliquely in plan view (or tapered), or the like. Alternatively, it may be tapered in plan view such that it is inclined toward either side.

First opposite electrode portion 26a of first internal electrode layer 16a and first lead electrode portion 28a of first internal electrode layer 16a may have an equal or substantially equal width, or one of them may have a smaller width than the other.

Second internal electrode layer 16b includes a second opposite electrode portion 26b opposite to first internal electrode layer 16a, and a second lead electrode portion 28b located on the side of one end of second internal electrode layer 16b and extending from second opposite electrode portion 26b toward second major surface 12b of multilayer body 12. Second lead electrode portion 28b includes an end thereof extending to second major surface 12b and thus exposed.

While second opposite electrode portion 26b of second internal electrode layer 16b is not particularly limited in shape, it is preferably rectangular or substantially rectangular in plan view. However, it may have a rounded corner, a corner extending obliquely in plan view (or tapered), or the like. Alternatively, it may be tapered in plan view such that it is inclined toward either side.

While second lead electrode portion 28b of second internal electrode layer 16b is not particularly limited in shape, it is preferably rectangular or substantially rectangular in plan view. However, it may have a corner rounded, a corner extending obliquely in plan view (or tapered), or the like. Alternatively, it may be tapered in plan view such that it is inclined toward either side.

Second opposite electrode layer 26b of second internal electrode layer 16b and second lead electrode portion 28b of second internal electrode layer 16b may have an equal or substantially equal width, or one of them may have a smaller width than the other.

First internal electrode layer 16a and second internal electrode layer 16b can be made of, for example, an appropriate electrically conductive material such as a metal, for example Ni, Cu, Ag, Pd or Au, or an alloy including at least one of these metals, such as an Ag—Pd alloy.

Internal electrode layer 16, that is, first internal electrode layer 16a and second internal electrode layer 16b, each preferably has a thickness of about 0.2 μm or more and about 2.0 μm or less, for example.

Preferably, there are, for example, 4 or more and 300 or less first and second internal electrode layers 16a and 16b in total.

As shown in FIGS. 1 to 5, external electrode 30 is disposed on multilayer body 12 on the side of first major surface 12a and the side of second major surface 12b.

External electrode 30 includes a first external electrode 30a and a second external electrode 30b.

First external electrode 30a is disposed on a surface of first major surface 12a. More specifically, first external electrode 30a is disposed only on first major surface 12a. First external electrode 30a is disposed so as to cover first major surface 12a entirely or substantially entirely, for example. When first external electrode 30a is so disposed, first external electrode 30a is electrically connected to first lead electrode portion 28a of first internal electrode layer 16a.

Second external electrode 30b is disposed on a surface of second major surface 12b. More specifically, second external electrode 30b is disposed only on second major surface 12b. Second external electrode 30b is disposed so as to cover second major surface 12b entirely or substantially entirely, for example. When second external electrode 30b is so disposed, second external electrode 30b is electrically connected to second lead electrode portion 28b of second internal electrode layer 16b.

In multilayer body 12, first opposite electrode portion 26a of first internal electrode layer 16a and second opposite electrode portion 26b of second internal electrode layer 16b are opposite to each other with dielectric layer 14 interposed to generate a capacitance. Therefore, capacitance can be obtained between first external electrode 30a to which first internal electrode layer 16a is connected and second external electrode 30b to which second internal electrode layer 16b is connected, and a characteristic as a capacitor is thus obtained.

There is a difference of about 3 μm or less between a maximum thickness of a center portion of first and second external electrodes 30a and 30b and a thickness of a peripheral portion of first and second external electrodes 30a and 30b at a portion located on the first or second major surface 12a or 12b and located farther inward than a peripheral end portion of first and second external electrodes 30a and 30b by about 10% of a length of first and second external electrodes 30a and 30b that connects first and second side surfaces 12c and 12d or first and second end surfaces 12e and 12f.

The maximum thicknesses of the center portion of the first and second external electrodes is measured by the following method.

That is, multilayer ceramic capacitor 10 is solidified with resin, and polished to a length of about ½L in the length direction connecting the first and second end surfaces or a length of about ½W in the width direction connecting the first and second side surfaces to have a cross section parallel or substantially parallel to the polished surface. Subsequently, in the polished cross section, the external electrode is measured in thickness in a region of a center portion thereof at a portion where the external electrode has a maximum thickness. Note that the region of the center portion of the external electrode refers to an innermost region of about 80% when it is assumed that the first and second external electrodes have their width and length directions each represented as 100%.

Further, the peripheral portion of the first and second external electrodes at a portion located on the first or second major surface and located farther inward than the peripheral end portion of the first and second external electrodes by about 10% of a length of the first and second external electrodes that connects the first and second side surfaces or the first and second end surfaces, is measured in thickness by the following method.

That is, multilayer ceramic capacitor 10 is solidified with resin, and polished to a length of about ½L in the length direction connecting the first and second end surfaces or a length of about ½W in the width direction connecting the first and second side surfaces to have a cross section substantially parallel to the polished surface. Subsequently, in the polished cross section, the external electrode is measured in thickness at the portion located farther inward by about 10% as described above. In doing so, as the portion located farther inward by about 10%, the polished cross section is measured on the side of the first side surface and the side of the second side surface or the side of the first end surface and the side of the second end surface for a total of four locations, and an average value in thickness of the four locations is calculated and defined as the thickness of the peripheral portion of the first and second external electrodes.

Further, in a range of a field of view of about 50 μm square centered at a point inward by about 15% than the peripheral end portion of first or second external electrode 30a or 30b, an angle θ of about 4 degrees or less is formed by a straight line connecting points $P_1$ and $P_2$ of intersection of a surface of first and second external electrodes 30a and 30b and a sectional line defining the range of the field of view of about 50 μm square and a perpendicular or substantially perpendicular line to a vertical line passing through point of intersection $P_1$ or $P_2$.

Note that angle θ formed by a perpendicular or substantially perpendicular line to a vertical line and a surface of first and second external electrodes 30a and 30b in the range of the field of view of about 50 μm square centered at the point located on first or second major surface 12a or 12b and located farther inward than the peripheral end portion of first and second external electrodes 30a and 30b by about 15% of a length of first and second external electrodes 30a and 30b that connects the first and second side surfaces 12c and 12d or first and second end surfaces 12e and 12f, is measured by the following method.

That is, a laser displacement meter (a measurement device of a shape measuring laser microscope produced by KEYENCE CORPORATION) is used to measure a surface in level and analysis software: VK-H1XA is used to measure an angle in a range of about 50 μm square centered at a point about 15% farther inward than a peripheral end portion of first and second external electrodes 30a and 30b.

Figure 7:
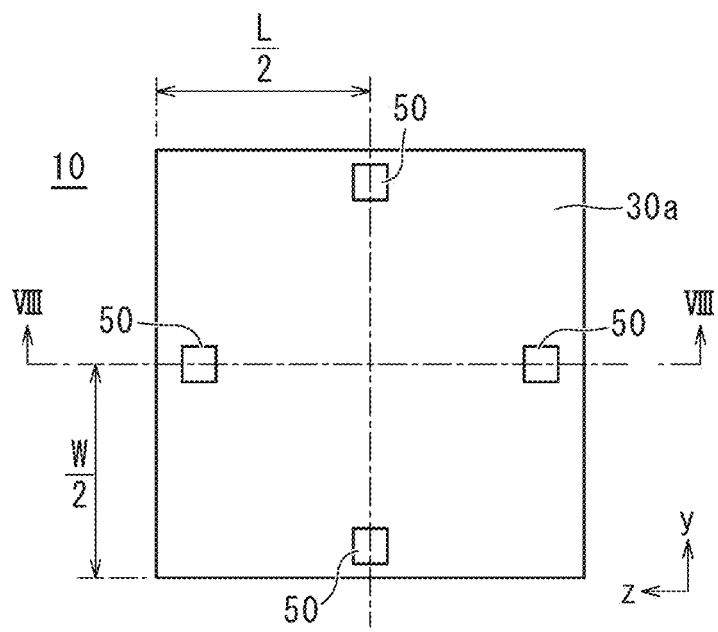
FIG. 7 is a diagram for illustrating a region for measuring an angle of a surface of the external electrode.
Figure 8:
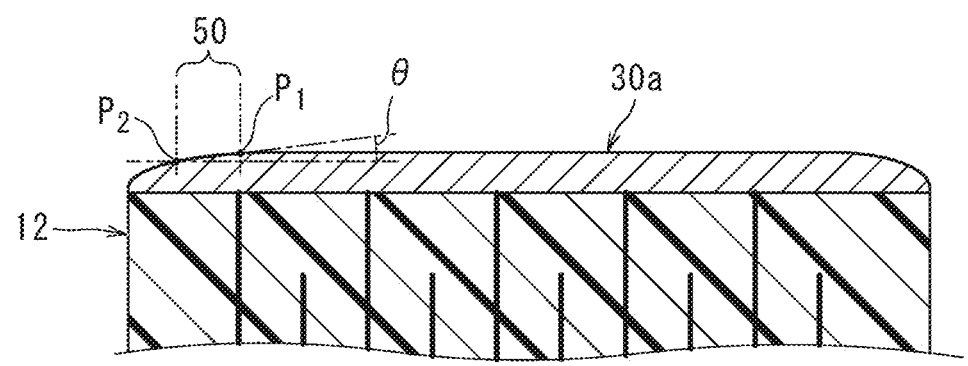
FIG. 8 is a cross section taken along a line VIII-VIII indicated in FIG. 7 for illustrating an angle at which the external electrode is measured.

More specifically, as shown in FIGS. 7 and 8, in a range of a field of view of about 50 μm square centered at a point located farther inward by about 15% than the peripheral end portion of first and second external electrodes 30a and 30b, angle θ formed by a straight line connecting points $P_1$ and $P_2$ of intersection of a surface of first and second external electrodes 30a and 30b and a sectional line defining the range of the field of view of about 50 μm square and a perpendicular or substantially perpendicular line to a vertical line passing through point of intersection $P_1$ or $P_2$, is measured. Note that in measuring angle θ, a side closer to the first side surface and a side closer to the second side surface or a side closer to the first end surface and a side closer to the second end surface for a total of four locations are subject to measurement, and an average value of values in angle obtained from the four locations is calculated as angle θ.

External electrode 30 includes an underlying electrode layer 32 including a metallic component, and a plating layer 40 disposed on a surface of underlying electrode layer 32.

Underlying electrode layer 32 includes a first underlying electrode layer 32a and a second underlying electrode layer 32b.

First underlying electrode layer 32a is disposed on first major surface 12a of multilayer body 12. More specifically, first underlying electrode layer 32a covers only first major surface 12a of multilayer body 12.

Second underlying electrode layer 32b is disposed on second major surface 12b of multilayer body 12. More specifically, second underlying electrode layer 32b covers only second major surface 12b of multilayer body 12.

Underlying electrode layer 32 may have a surface with irregularities.

When underlying electrode layer 32 has a surface with irregularities, the irregularities have an arithmetic mean roughness (Ra) preferably of about 0.5 μm or more and about 0.9 μm or less, for example. When underlying electrode layer 32 has a surface with irregularities, the irregularities have a surface roughness (Rz) preferably of about 5.0 μm or more and about 7.5 μm or less, for example. This can provide an anchoring effect to provide adhesive strength between underlying electrode layer 32 and plating layer 40.

The Ra and Rz of underlying electrode layer 32 can be measured for example with a laser displacement meter.

However, even when underlying electrode layer 32 has irregularities, it is preferable that when plating layer 40 is formed it be formed with a plating condition such that external electrode 30 has a flat surface.

Underlying electrode layer 32 is, for example, a baked layer.

The baked layer preferably includes a metallic component and either a glassy component or a ceramic component or both the glassy component and the ceramic component, for example. In the present preferred embodiment, underlying electrode layer 32 is, for example, a baked layer including a metallic component and a ceramic component. This improves adhesive strength between multilayer body 12 and the baked layer, and can reduce or prevent intrusion of moisture inside multilayer body 12. As a result, multilayer ceramic capacitor 10 can be improved in reliability in moisture resistance.

The glassy component of the baked layer includes, for example, at least one selected from B, Si, Ba, Mg, Al, Li, and the like. When the ceramic component is included, the ceramic component may be a ceramic component of the same type as the dielectric layer or a type different than the dielectric layer.

The metallic component of the baked layer includes, for example, at least one selected from Cu, Ni, Ag, Pd, an Ag—Pd alloy, Au, and the like.

The baked layer is formed by applying to multilayer body 12 and baking an electrically conductive paste including a ceramic component and a metallic component. The baked layer may be obtained by simultaneously firing a multilayer chip including internal electrode layer 16 and dielectric layer 14 and the electrically conductive paste applied to the multilayer chip, or may be obtained by firing the multilayer chip having internal electrode layer 16 and dielectric layer 14 to obtain multilayer body 12, and subsequently applying the electrically conductive paste to multilayer body 12 and baking it. When the multilayer chip including internal electrode layer 16 and dielectric layer 14 and the electrically conductive paste applied to the multilayer chip are simultaneously fired, it is preferable that the baked layer is formed by baking a material with a dielectric material (a ceramic component) added thereto instead of a glassy component. The baked layer may include a plurality of layers.

First underlying electrode layer 32a located on first major surface 12a at a center portion in width direction y connecting first and second side surfaces 12c and 12d includes first and second baked layers having a thickness preferably of, for example, about 5 μm or more and about 14 μm or less.

Second underlying electrode layer 32b located on second major surface 12b at a center portion in width direction y connecting first and second side surfaces 12c and 12d has first and second baked layers having a thickness preferably of, for example, about 5 μm or more and about 14 μm or less.

Plating layer 40 includes a first plating layer 40a and a second plating layer 40b.

First plating layer 40a is disposed on first major surface 12a. More specifically, first plating layer 40a is disposed only on first major surface 12a so as to cover a surface of first underlying electrode layer 32a.

Second plating layer 40b is disposed on second major surface 12b. More specifically, second plating layer 40b is disposed only on second major surface 12b so as to cover a surface of second underlying electrode layer 32b.

Plating layer 40 may include a plurality of layers.

Plating layer 40 includes, for example, at least one selected from Cu, Ni, Sn, Ag, Pd, an Ag—Pd alloy, Au, and the like.

When plating layer 40 includes a plurality of layers, plating layer 40 preferably includes, as seen on the side of multilayer body 12, a lower plating layer 42 covering underlying electrode layer 32, an intermediate plating layer 44 disposed so as to cover lower plating layer 42, and an upper plating layer 46 disposed so as to cover intermediate plating layer 44.

Preferably, lower plating layer 42 is a Cu plating layer, intermediate plating layer 44 is a Ni plating layer, and upper plating layer 46 is an Au plating layer, for example.

The Cu plating layer can prevent moisture from penetrating during Ni-plating, the Ni plating layer forms an underlying layer for Au-plating and can thus alleviate irregularities of a surface of underlying electrode layer 32, and the Au plating layer can obtain bonding strength through metal diffusion with an Au wire.

A single plating layer preferably has a thickness of about 1 μm or more and about 15 μm or less, for example.

Lower plating layer 42 includes a first lower plating layer 42a and a second lower plating layer 42b.

First lower plating layer 42a is disposed on the side of first major surface 12a so as to cover a surface of first underlying electrode layer 32a. Second lower plating layer 42b is disposed on the side of second major surface 12b so as to cover a surface of second underlying electrode layer 32b.

Intermediate plating layer 44 includes a first intermediate plating layer 44a and a second intermediate plating layer 44b.

First intermediate plating layer 44a is disposed so as to directly cover first lower plating layer 42a. Second intermediate plating layer 44b is disposed so as to directly cover second lower plating layer 42b.

Upper plating layer 46 includes a first upper plating layer 46a and a second upper plating layer 46b.

First upper plating layer 46a is disposed so as to directly cover first intermediate plating layer 44a.

Second upper plating layer 46b is disposed so as to directly cover second intermediate plating layer 44b.

L, T and W are dimensions of multilayer ceramic capacitor 10 in length direction z, height direction x, and width direction y, respectively.

Multilayer ceramic capacitor 10 preferably has, for example, a dimension L in length direction z of about 0.25 mm or more and about 0.8 mm or less, a dimension W in width direction y of about 0.25 mm or more and about 0.8 mm or less, and a dimension T in height direction x of about 0.2 mm or more and about 0.5 mm or less.

The dimensions of multilayer ceramic capacitor 10 can be measured with a microscope.

The multilayer ceramic capacitor 1 shown in FIG. 1 has a difference of about 3 μm or less between a maximum thickness of a center portion of first and second external electrodes 30a and 30b and a thickness of a peripheral portion of first and second external electrodes 30a and 30b at a portion located on first or second major surface 12a or 12b and located farther inward than a peripheral end portion of first and second external electrodes 30a and 30b by about 10% of a length of first and second external electrodes 30a and 30b that connects first and second side surfaces 12c and 12d or first and second end surfaces 12e and 12f, and in a range of a field of view of about 50 μm square centered at a point located farther inward by about 15% than the peripheral end portion of first or second external electrode 30a or 30b, the multilayer ceramic capacitor has an angle θ of about 4 degrees or less defined by a straight line connecting points $P_1$ and $P_2$ of intersection of a surface of first and second external electrodes 30a and 30b and a sectional line defining the range of the field of view of 50 μm square and a perpendicular or substantially perpendicular line to a vertical line passing through point of intersection $P_1$ or $P_2$. In a range of a field of view of about 50 μm square centered at a point located farther inward by about 15% than an edge of first or second external electrode 30a or 30b, the multilayer ceramic capacitor has an angle θ of about 4 degrees or less defined by a straight line connecting points $P_1$ and $P_2$ of intersection of a surface of first and second external electrodes 30a and 30b and a sectional line defining the range of the field of view of about 50 μm square and a perpendicular or substantially perpendicular line to a vertical line passing through point of intersection $P_1$ or $P_2$.

Thus, first external electrode 30a and second electrode 30b have a surface of external electrode 30 which is uniform in thickness and is flat. Thus, multilayer ceramic capacitor 10 relatively miniaturized will have external electrode 30 having a flat surface, and when 2nd wire bonding is done near a peripheral portion, such as four corners, of external electrode 30, in particular, multilayer ceramic capacitor 10 includes external electrode 30 that interfere less with a nozzle (a capillary) during 2nd wire bonding. This ensures that 2nd wire bonding is performed to provide reliable connection of a wire to external electrode 30.

Further, the multilayer ceramic capacitor 10 shown in FIG. 1 includes first and second external electrodes 30a and 30b that with a surface of external electrode 30 that is uniform in thickness and flat, and thus ensures that 2nd wire bonding can be performed on a surface of external electrode 30 in a large area. This allows a larger number of wires to be bonded and a short wire to be bonded. As a result, high-frequency impedance can be reduced, and a ceramic electronic device can be high in functionality, as will be described hereinafter.

Further, the multilayer ceramic capacitor 10 in FIG. 1 includes external electrode 30 with underlying electrode layer 32 being a baked layer, and underlying electrode layer 32 is thus not formed by plating and external electrode 30 can thus have a flat surface. This can reduce or prevent intrusion of moisture passing between multilayer body 12 and external electrode 30 or the like into multilayer ceramic capacitor 10, and thus, a reduction in moisture resistance of multilayer ceramic capacitor 10.

Further, the multilayer ceramic capacitor 10 in FIG. 1 includes first and second external electrodes 30a and 30b that have a surface of external electrode 30 that is uniform in thickness and is flat, and when multilayer ceramic capacitor 10 is mounted on a mounting substrate via a bonding material, that is, during die-bonding, better adhesion can be achieved between a suction nozzle that suctions and moves multilayer ceramic capacitor 10 to the mounting substrate and a surface of external electrode 30 of multilayer ceramic capacitor 10. This can reduce or prevent erroneous suction of multilayer ceramic capacitor 10.

Furthermore, the multilayer ceramic capacitor 10 in FIG. 1 includes first and second external electrodes 30a and 30b that have a surface of external electrode 30 that is uniform in thickness and is flat, and when an image is sensed to confirm a mounting position for multilayer ceramic capacitor 10 and determining whether the multilayer ceramic capacitor passes or fails in appearance, not only a center portion of multilayer ceramic capacitor 10 but a peripheral portion of multilayer ceramic capacitor 10 can also be in focus. As a result, the mounting position for multilayer ceramic capacitor 10 is clearly confirmed, and whether multilayer ceramic capacitor 10 passes or fails in appearance can be determined with better accuracy.

2. Method for Manufacturing Multilayer Ceramic Capacitor

Hereinafter a non-limiting example of a method for manufacturing the multilayer ceramic capacitor will be described.

Initially, a ceramic green sheet for the dielectric layer and an electrically conductive paste for the internal electrode layer are prepared. The ceramic green sheet and the electrically conductive paste for the internal electrode layer include a binder and a solvent. The binder and the solvent may be a known binder and a known solvent.

Then, the electrically conductive paste for the internal electrode layer is printed on the ceramic green sheet in a predetermined pattern, for example, by screen printing, gravure printing or the like. Thus, a ceramic green sheet on which the pattern of the first internal electrode layer is formed and a ceramic green sheet on which the pattern of the second internal electrode layer is formed are prepared. The electrically conductive paste for the internal electrode layer includes, for example, powdery metal with an organic binder and an organic solvent added thereto. For the ceramic green sheet, a ceramic green sheet provided for an outer layer and including no pattern of the internal electrode layer printed thereon is also prepared.

Subsequently, a predetermined number of ceramic green sheets for the outer layer including no pattern of the internal electrode layer printed thereon are stacked to form a portion to be an outer layer portion on the side of the second end surface. Thereon, the ceramic green sheet on which the pattern of the first internal electrode layer is printed and the ceramic green sheet on which the pattern of the second internal electrode layer is printed are sequentially stacked to provide the structure of the present preferred embodiment to form a portion to be an inner layer portion. On the portion to be the inner layer portion, the predetermined number of ceramic green sheets for the outer layer including no pattern of the internal electrode layer printed thereon are stacked to form a portion to be an outer layer portion on the side of the first end surface. Thus, a multilayer sheet is produced.

Subsequently, the multilayer sheet is pressed in the layer stacking direction by, for example, hydrostatic pressing to produce a multilayer block.

The multilayer block is cut into a predetermined size to cut out a multilayer chip. In doing so, the multilayer chip may be, for example, barrel polished or the like to include a corner and a ridge rounded.

Subsequently, the multilayer chip is fired to produce multilayer body 12, and the multilayer body and the underlying electrode layer are obtained in the below-described method depending on how the underlying electrode layer is formed.

Underlying Electrode Layer

A description will be provided of a case in which when forming an underlying electrode layer, a multilayer chip including an internal electrode layer and a dielectric layer is fired to obtain a multilayer body and subsequently, an electrically conductive paste is applied to the multilayer body and baked.

Initially, the electrically conductive paste to define and function as the underlying electrode layer is applied to both major surfaces of the multilayer body to form the underlying electrode layer. Specifically, an electrically conductive paste including a glassy component and a metallic component is applied by, for example, screen printing, and then baked to form the underlying electrode. The baking is preferably formed, for example, at about 700° C. or higher and about 900° C. or lower.

In doing so, the underlying electrode layer of the external electrode according to the present preferred embodiment can be formed when the underlying electrode layer according to the present preferred embodiment is formed of an electrically conductive paste adjusted in viscosity to have a property to present low viscosity for high shear rate and high viscosity for low shear rate and a printing plate has a controlled spatial volume.

In contrast, a case in which a multilayer body including an underlying electrode layer is formed will be described wherein when forming the underlying electrode layer, a multilayer body and an electrically conductive paste to define and function as the underlying electrode layer are simultaneously fired.

The electrically conductive paste to define and function as the underlying electrode layer is applied to both major surfaces of the multilayer chip to form the underlying electrode layer. Specifically, an electrically conductive paste including a ceramic component of the same type as the dielectric layer and a metallic component is applied to the multilayer chip by, for example, screen printing.

In doing so, the underlying electrode layer of the external electrode according to the present preferred embodiment can be formed when the underlying electrode layer according to the present preferred embodiment is formed of an electrically conductive paste adjusted in viscosity to have a property to present low viscosity for high shear rate and high viscosity for low shear rate and a printing plate has a controlled spatial volume.

Thereafter, the multilayer chip and the electrically conductive paste applied to the multilayer chip are simultaneously fired to produce a multilayer body with the underlying electrode layer formed. The firing is preferably performed at, for example, about 900° C. or higher and about 1400° C. or lower, although it depends on the materials of the dielectric and the internal electrode layer.

Thereafter, plating layer 40 is formed.

That is, first plating layer 40a is formed on a surface of first underlying electrode layer 32a, and second plating layer 40b is formed on a surface of second underlying electrode layer 32b. Specifically, first plating layer 40a is formed so as to completely or substantially completely cover the surface of first underlying electrode layer 32a disposed on first major surface 12a. Second plating layer 40b is formed so as to completely or substantially completely cover the surface of second underlying layer 32b disposed on second major surface 12b.

More specifically, plating layer 40 is formed of lower plating layer 42, intermediate plating layer 44 disposed on lower plating layer 42, and upper plating layer 46 disposed on intermediate plating layer 44.

Lower plating layer 42 is formed of a Cu plating layer, intermediate plating layer 44 is formed of a Ni plating layer, and upper plating layer 46 is formed of an Au plating layer.

Further, in the present preferred embodiment, in forming each plating layer as well, by barrel-plating with a medium's diameter, a barrel's rotational speed and the like controlled, the plating layer can also have a surface formed in a flat film. In doing so, the medium used when the surface of the plating layer is formed flat is preferably a medium having a diameter larger than a typical diameter. When the surface of the plating layer is formed flat, it is preferable that the barrel's rotational speed is faster than a typical rotational speed.

Multilayer ceramic capacitor 10 is thus manufactured.

3. Ceramic Electronic Device Using Multilayer Ceramic Capacitor

Subsequently, a ceramic electronic device including the multilayer ceramic capacitor according to a preferred embodiment of the present invention will be described.

Figure 9:
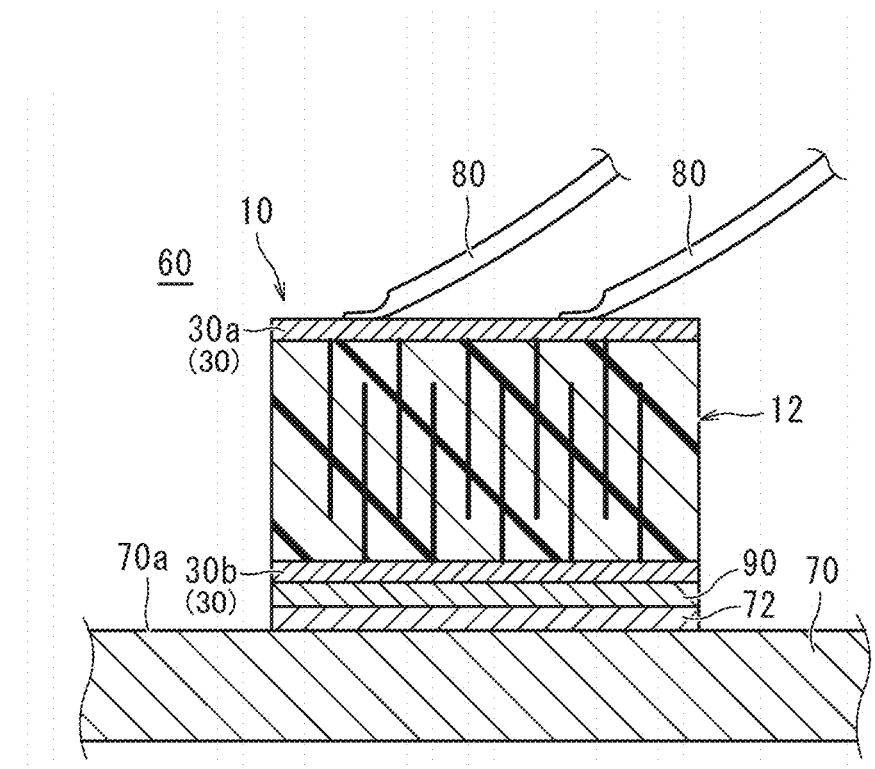
FIG. 9 is a diagram showing an example of a ceramic electronic device obtained by mounting a multilayer ceramic capacitor according to one of the preferred embodiments of the present invention on a substrate.

FIG. 9 is a diagram showing an example of a ceramic electronic device obtained by mounting the multilayer ceramic capacitor according to a preferred embodiment of the present invention on a substrate.

The multilayer ceramic capacitor 10 in FIG. 1 can be used, for example, as a component of a ceramic electronic device as shown in FIG. 9. Ceramic electronic device 60 includes multilayer ceramic capacitor 10, a substrate 70, and a wire 80.

Substrate 70 is disposed such that second major surface 12b of multilayer ceramic capacitor 10 faces a major surface 70a of substrate 70. A land electrode 72 is disposed on a surface of major surface 70a of substrate 70. Multilayer ceramic capacitor includes second external electrode 30b connected to land electrode 72 via an electrically conductive adhesive cured, an Au foil, and solder 90, for example.

Applying heat, ultrasonic waves, and a load to first external electrode 30a formed on a surface of first major surface 12a of multilayer ceramic capacitor 10 to cause metal diffusion between wire 80 and first external electrode 30a allows wire 80 to be electrically connected to first external electrode 30a.

4. Exemplary Experiment

Subsequently, in order to confirm the advantageous effects of the multilayer ceramic capacitor according to the preferred embodiment described above, multilayer ceramic capacitors were produced and tested to evaluate wire bonding connectivity and moisture resistance reliability.

(1) Specifications of Multilayer Ceramic Capacitors According to Samples 1 to 5

Initially, the above-described method for producing a multilayer ceramic capacitor was used to produce a multilayer ceramic capacitor having the following specification:

Multilayer ceramic capacitor's size L×W×T (including design value): about 0.5 mm×about 0.5 mm×about 0.35 mm Dielectric layer's material (major component): $BaTiO_3$ Internal electrode layer's material: Ni Internal electrode layer's thickness: about 2.0 μm External electrode's structure: an underlying electrode layer and a plating layer External electrode's thickness: See Table 1. Each sample includes an external electrode layer including an underlying electrode layer varied in thickness.

Underlying electrode layer's material: electrically conductive metal (Ni) and dielectric material ($BaTiO_3$)

Plating layer: three-layer structure of Cu plating layer, Ni plating layer and Au plating layer Lower plating layer: Cu plating Lower plating layer's thickness: center portion: about 6 μm Portion located farther inward than an end by about 10% of the length of the underlying electrode layer: about 6 μm Intermediate plating layer: Ni plating Intermediate plating layer's thickness: center portion: about 3 μm Portion located farther inward than an end by about 10% of the length of the underlying electrode layer: about 3 μm Upper plating layer: Au plating Upper plating layer's thickness: center portion: about 0.8 μm Portion located farther inward than an end by about 10% of the length of the underlying electrode layer: about 0.8 μm (2) Specification of Multilayer Ceramic Capacitor According to Sample 6

The multilayer ceramic capacitor according to Sample 6 had an external electrode that is a plated electrode.

The multilayer ceramic capacitor had dimensions and a plating layer having specifications as below:

Multilayer ceramic capacitor's size L×W×T (including design value): about 0.25 mm×about 0.25 mm×about 0.2 mm Dielectric layer's material: $BaTiO_3$ Internal electrode layer's material: Ni Internal electrode layer's thickness: about 1.5 μm External electrode's structure: formed as an electrode by plating External electrode's thickness: center portion: about 10 μm Portion located farther inward than an end by about 10% of the length of the underlying electrode layer: about 0 μm External electrode's material: Au plating (3) Method for Measuring Thickness A method described below was used to measure a maximum thickness of a center portion of the first and second external electrodes.

That is, a sample, or a multilayer ceramic capacitor, was solidified with resin, and polished to a length of about ½L in the length direction connecting the first and second end surfaces or a length of about ½W in the width direction connecting the first and second side surfaces to have a cross section parallel or substantially parallel to the polished surface. Subsequently, in the polished cross section, the external electrode was measured in thickness in a region of a center portion thereof at a portion where the external electrode had a maximum thickness. Note that the region of the center portion of the external electrode refers to an innermost region of about 80% when it is assumed that the first and second external electrodes have their width and length directions each represented as 100%.

The peripheral portion of the first and second external electrodes at a portion located on the first or second major surface and located farther inward than the peripheral end portion of the first and second external electrodes by about 10% of a length of the first and second external electrodes that connects the first and second side surfaces or the first and second end surfaces, was measured in thickness in the following method.

That is, a sample, or a multilayer ceramic capacitor, was solidified with resin, and polished to a length of about ½L in the length direction connecting the first and second end surfaces or a length of about ½W in the width direction connecting the first and second side surfaces to have a cross section parallel substantially parallel to the polished surface. Subsequently, in the polished cross section, the external electrode was measured in thickness at the portion located farther inward by about 10% as described above. In doing so, as the portion located farther inward by about 10%, the polished cross section was measured on the side of the first side surface and the side of the second side surface or the side of the first end surface and the side of the second end surface for a total of four locations, and an average value in thickness of the four locations was calculated.

(4) Method for Measuring Angle θ

Angle θ formed between a perpendicular or substantially perpendicular line to a vertical line and a surface of the first and second external electrodes at a portion located on the first or second major surface and inner than the peripheral end portion of the first and second external electrodes by about 15% of a length of the first and second external electrodes that connects the first and second side surfaces or the first and second end surfaces, was measured in the following method.

That is, a laser displacement meter (a measurement device of a shape measuring laser microscope produced by KEYENCE CORPORATION) was used to measure a surface in level and analysis software: VK-H1XA was used to measure an angle in a range of about 50 μm square centered at a point about 15% farther inward than an edge of first and second external electrodes 30a and 30b.

More specifically, as shown in FIGS. 7 and 8, in a range of a field of view of about 50 μm square centered at a point located farther inward by about 15% than an edge of first and second external electrodes 30a and 30b, angle θ formed by a straight line connecting points $P_1$ and $P_2$ of intersection of a surface of first and second external electrodes 30a and 30b and a sectional line defining the range of the field of view of about 50 μm square and a perpendicular or substantially perpendicular to a vertical line passing through point of intersection $P_1$ or $P_2$, was measured. Note that in measuring angle θ, a side closer to the first side surface and a side closer to the second side surface or a side closer to the first end surface and a side closer to the second end surface for a total of four locations were subjected to measurement, and an average value of values in angle obtained from the four locations was calculated as angle θ.

(5) Wire Bonding Connectivity Test

Wire bonding connectivity was confirmed by subjecting each sample to a wire adhesion strength test based on MIL-STD-883 Method 2011.

More specifically, each sample was mounted on a wiring board using a conductive adhesive or solder, and wire bonding was performed on the first major surface and a land of the substrate. The wire was pulled up vertically until the loop of the wire was broken, and the breaking strength and the location of the breakage were observed. A sample with a breaking strength of about 30 mN (3 gf) or more and a breaking mode which is not breakage at an interface of connection of the capacitor and the wire, was determined as "good."

(6) Moisture Resistance Reliability Test

Moisture resistance reliability was confirmed as follows.

That is, each sample was subjected to a moisture resistance reliability test based on the PCBT test method.

More specifically, each sample was mounted on a wiring board using eutectic solder, and put in a high-temperature and high-humidity bath having a temperature of about 125° C. and a relative humidity of about 95% RH, and a DC current of about 6.3 V was applied between a pair of external electrodes. This state was then maintained for about 72 hours. Thereafter, a sample which did not have an insulation resistance value decreased by two digits or more between before and after the test was determined as "good," and a sample which had an insulation resistance value decreased by two digits or more between before and after the test was determined as "defective." When there is at least one defective sample out of 23 samples, a decision of being "defective" was made. An evaluation result is shown in Table 1.

TABLE 1

| | sample Nos. | | | | | |
|---|---|---|---|---|---|---|
| | 1 | 2 | 3 | 4 | 5 | 6 |
| maximum thickness of center portion of external electrode (μm) | 13 | 15 | 17 | 21 | 25 | 10 |
| thickness of peripheral portion of external electrode (μm) | 12 | 13 | 14 | 18 | 20 | 10 |
| difference in thickness (μm) | 1 | 2 | 3 | 3 | 5 | 0 |
| inclination in inclination measurement region of external electrode (°) | 2 | 3 | 4 | 4.5 | 5 | 0 |
| wire bonding connectivity (counts) | 0/10 | 0/10 | 0/10 | 1/10 | 5/10 | 0/10 |
| moisture resistance reliability test (counts) | 0/23 | 0/23 | 0/23 | 0/23 | 0/23 | 9/23 |

(7) Result of Experiment

As shown in Table 1, the multilayer ceramic capacitors of the samples of Sample Nos. 1 to 3 were such that there is a difference in thickness of about 3 μm or less between a maximum thickness of a center portion of the external electrode and a peripheral portion of the external electrode and the external electrode had a prescribed peripheral portion with a surface having an angle of about 4° or less, and the external electrode thus had a flat surface and there was no wire bonding connection failure caused. Further, as the external electrode includes an underlying electrode layer including a metallic component and a ceramic component, and a plating layer disposed on the underlying electrode layer, it was confirmed that intrusion of moisture passing between the external electrode and the multilayer body into the multilayer ceramic capacitor can be reduced or prevented and reduction in moisture resistance may be reduced or prevented.

In contrast, the multilayer ceramic capacitor of the sample of Sample No. 4 was such that while the external electrode included a center portion having a maximum thickness and a peripheral portion having a thickness, with a difference in thickness of about 3 µm or less, the external electrode had a prescribed peripheral portion with a surface having an angle of about 4.5° and thus failing to ensure flatness, and of 10 samples thereof, one sample had wire bonding connection failure.

Further, the multilayer ceramic capacitor of the sample of Sample No. 5 was such that the external electrode included a center portion having a maximum thickness and a peripheral portion having a thickness, with a difference in thickness of about 5 µm or less, and the external electrode had a prescribed peripheral portion with a surface having an angle of about 5° and thus failing to ensure flatness, and of 10 samples thereof, five samples had wire bonding connection failure.

Further, the multilayer ceramic capacitor as the sample of Sample No. 6 included an external electrode which was a plated electrode and thus ensured flatness, and accordingly, it did not have wire bonding connection failure. However, it was unable to reduce or prevent intrusion of moisture passing between the external electrode and the multilayer body into the multilayer ceramic capacitor, and as a result of the moisture resistance reliability test, nine of 23 samples thereof were defective.

From the above results of the experiment, the multilayer ceramic capacitors of the samples of Sample Nos. 1 to 3 according to a preferred embodiment of the present invention are such that there is a difference of about 3 µm or less between a maximum thickness of a center portion of the first and second external electrodes and a thickness of a peripheral portion of the first and second external electrodes at a portion located on the first or second major surface and located farther inward than a peripheral end portion of the first and second external electrodes by about 10% of a length of the first and second external electrodes that connects the first and second side surfaces or the first and second end surfaces, and in a range of a field of view of about 50 µm square centered at a point located farther inward by about 15% than the peripheral end portion of the first or second external electrode, the multilayer ceramic capacitor has an angle θ of about 4 degrees or less defined by a straight line connecting points $P_1$ and $P_2$ of intersection of a surface of the first and second external electrodes and a sectional line defining the range of the field of view of about 50 µm square and a perpendicular or substantially perpendicular line to a vertical line passing through point of intersection $P_1$ or $P_2$.

Thus, the external electrode has a flat surface, and when 2nd wire bonding is performed near a peripheral portion, such as four corners, of the external electrode, in particular, the multilayer ceramic capacitor includes the external electrode that interfere less with a nozzle (a capillary) while the wire bonding is performed. As a result, it has been clarified that the wire bonding can be performed to provide reliable connection of a wire to the external electrode.

Furthermore, in preferred embodiments of the present invention, the external electrode can have a surface formed flat without using a method to form the underlying electrode layer by direct plating. Thus it has been clarified that intrusion of moisture passing between the external electrode and the multilayer body into the multilayer ceramic capacitor can be reduced or prevented, and thus reduction in moisture resistance of the multilayer ceramic capacitor can be reduced or prevented.

Further, in preferred embodiments of the present invention, the external electrode that is flat ensures that 2nd wire bonding is performed in a wide area. This allows a larger number of wires to be bonded and a short wire to be bonded. As a result, high-frequency impedance can be reduced, and a ceramic electronic device can be high in functionality.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of stacked dielectric layers, and including a first major surface and a second major surface opposite to each other in a height direction and facing a mounting surface, a first side surface and a second side surface opposite to each other in a width direction orthogonal or substantially orthogonal to the height direction, and a first end surface and a second end surface opposite to each other in a length direction orthogonal or substantially orthogonal to the height direction and the width direction;
   a first internal electrode on the plurality of dielectric layers, located inside the multilayer body, and extending to the first major surface;
   a second internal electrode on the plurality of dielectric layers, located inside the multilayer body, and extending to the second major surface;
   a first external electrode on the first major surface; and
   a second external electrode on the second major surface; wherein
   the first and second external electrodes include an underlying electrode layer including a metallic component and a ceramic component, and a plating layer on the underlying electrode layer;
   a difference of about 3 µm or less exists between a maximum thickness of a center portion of the first and second external electrodes and a thickness of a peripheral portion of the first and second external electrodes at a portion located on the first or second major surface and located farther inward than a peripheral end portion of the first and second external electrodes by about 10% of a length of the first and second external electrodes that connects the first and second side surfaces or the first and second end surfaces; and
   in a range of a field of view of about 50 µm square centered at a point located farther inward by about 15% than the peripheral end portion of the first or second external electrode, an angle θ of about 4 degrees or less is defined by a straight line connecting points $P_1$ and $P_2$ of an intersection of a surface of the first and second external electrodes and a sectional line defining the range of the field of view of about 50 µm square and a perpendicular or substantially perpendicular line to a vertical line passing through point of intersection $P_1$ or $P_2$.

2. The multilayer ceramic capacitor according to claim 1, wherein the plating layer includes a Cu plating layer, a Ni plating layer, and an Au plating layer.

3. The multilayer ceramic capacitor according to claim 1, wherein a number of the plurality of dielectric layers is 45 to 330.

4. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

5. The multilayer ceramic capacitor according to claim 4, wherein each of the plurality of dielectric layers further includes at least one of a Mn compound, an Fe compound, a Cr compound, a Co compound, or a Ni compound as a sub-component.

6. The multilayer ceramic capacitor according to claim 1, wherein a thickness of each of the plurality of dielectric layers is about 0.5 μm or more and about 42 μm or less.

7. The multilayer ceramic capacitor according to claim 1, wherein each of the first and second internal electrodes includes Ni, Cu, Ag, Pd or Au, or an alloy including at least one of Ni, Cu, Ag, Pd or Au.

8. The multilayer ceramic capacitor according to claim 1, wherein a thickness of each of the first and second internal electrodes is about 0.2 μm or more and about 2.0 μm or less.

9. The multilayer ceramic capacitor according to claim 1, wherein the underlying electrode layer includes a first underlying electrode layer and a second underlying electrode layer.

10. The multilayer ceramic capacitor according to claim 1, wherein the underlying electrode layer includes irregularities having an arithmetic mean roughness of about 0.5 μm or more and about 0.9 μm or less.

11. The multilayer ceramic capacitor according to claim 1, wherein the underlying electrode layer includes irregularities having an arithmetic mean roughness of about 5.0 μm or more and about 7.5 μm or less.

12. The multilayer ceramic capacitor according to claim 1, wherein the underlying electrode layer is a baked layer.

13. The multilayer ceramic capacitor according to claim 1, wherein the metallic component of underlying electrode layer includes at least one of Cu, Ni, Ag, Pd, an Ag—Pd alloy, or Au.

\* \* \* \* \*